Patented Apr. 13, 1948

UNITED STATES PATENT OFFICE 2,439,442

PROCESS OF MAKING HYDROPHILIC CARBON BLACK

Fred H. Amon, Weston, and Fred S. Thornhill, Hyde Park, Mass., assignors to Godfrey L. Cabot, Inc., Boston, Mass., a corporation of Massachusetts No Drawing. Application February 6, 1943, Serial No. 475,050

2 Claims. (Cl. 23—209.1)

This invention consists in a process of making hydrophilic carbon black products having characteristics not found in any carbon blacks heretofore available to the industry and which adapt them for use in new fields of industry.

Carbon black in all its various forms heretofore known is naturally hydrophobic and organophilic, that is, it preferentially disperses in nonpolar substances such as benzene, whereas it has been impractical except with the greatest difficulty to form even temporary suspensions of carbon black in aqueous solutions. On this account it has proved impracticable heretofore to disperse carbon black in either natural or synthetic rubber latex. Previous attempts have failed due to the fact that standard grades of carbon black very completely precipitated the latex hydrocarbon from the serum, or changed the fluid latex to a gelatinous mass.

We have discovered that by exothermally reacting carbon black with a water solution of sodium hypochlorite, or by bringing about exothermic reaction in subjecting it to electrolysis in a solution of sodium chloride, or by suspending the black in a water solution of sodium hydroxide and adding chlorine gas it is possible radically to alter the colloidal properties of carbon black so that it will readily and spontaneously disperse to form an excellent stable suspension in water. This new product has, among others, the valuable and unpredictable characteristic of entering into complete dispersion with water and forming therewith an ink which cannot be washed from news print with water alone but can be readily and completely removed by a dilute calcium hypochlorite solution. When a 5% or 10% water suspension of this new hydrophilic carbon black is added to synthetic or natural rubber latices, a very stable dispersion without coagulation is obtained, a condition which may be verified by precipitating the rubber from the latex with acetic acid and making a microscopic examination of the coagulated material.

In one important aspect our invention consists in a water dispersible carbon black in paste form. Heretofore a colloidal graphite paste has been used as a special lubricant for glass and metal molds and for glass working tools. The great amount of grinding and milling work necessary to produce this graphite product necessitates a high price for it. However, we have further discovered that a water paste containing 30 to 60% of the water-dispersible black of our invention, when properly diluted, may be used with entire satisfaction as a lubricant in this and other similar fields.

One process for producing the novel carbon black of our invention is to suspend agitated carbon black in a water solution of sodium chloride and then subject the solution to electrolysis. During this action chlorine is freely evolved and a considerable concentration of sodium hypochlorite is built up in the solution. Upon removing the carbon black and drying it, the resulting product is found to have striking water-dispersing characteristics. In many instances the carbon black itself, during air drying, takes on a remarkable blue sheen.

An alternative process for producing the same results consists in subjecting the carbon black of commerce to vigorous oxidizing conditions at substantially room temperature through the medium of sodium hypochlorite. One satisfactory formula consists in stirring 100 grams of carbon black with 300 c. c. of water and 300 c. c. of 10% sodium hypochlorite solution at a temperature of 30° C. A violent exothermic reaction occurs. The sludge is then acidified with hydrochloric acid and the sodium chloride and excess hydrochloric acid washed out. The carbon black may then be separated from the sludge by centrifuging, filtering and air drying at a temperature of less than 100° C. On the addition of a few drops of ammonia this carbon black product will at once enter into complete dispersion with water forming a satisfactory ink.

Gastex carbon black, P-33 black, and acetylene black, or finely ground charcoal, although normally hydrophobic, can by this treatment be converted into hydrophilic products. Carbon blacks of the Carbolac type, commonly used in lacquers, react instantly and extremely violently with a solution of sodium hypochlorite and require a somewhat larger amount of the latter to effect a complete transformation to water-dispersible form.

Dispersible carbon black produced as above outlined is of value as a reinforcing agent for synthetic rubber, and may be incorporated with the latex for example, to the extent of 35% of the total hydrocarbon content without adverse effects on any physical properties of the resulting synthetic rubber compound. In fact, the compound thus produced is the full equal of any synthetic rubber compound in which the same percentage of carbon black in a dry state has been incorporated by milling. It is noted that in the dispersion of the carbon black in the rubber latex the well dispersed particles are clearly visible at a magnification of 1800 diameters.

The water-dispersible black used in the paste product may be prepared from carbon black in granular form, for example, Grade 6 Spheron. A satisfactory formula calls for 100 grams of this carbon black to be treated with 300 c. c. of water and 300 c. c. of 10% hypochlorite solution. This mixture forms a sludge which should be allowed to stand for about 24 hours for complete reaction. The pH of the sludge is 8-9. Hydrochloric acid is next added to acidify the sludge to a pH of about 2, and in the illustrative formula about 10 c. c. of concentrated hydrochloric acid is required. The treated carbon black is then filtered from the said sludge, washed with about 500 c. c. of water to remove the NaCl formed in the reaction, and any excess of HCl. The presence of NaCl or excess acid interferes with the desired water-dispersing characteristics of the product. When they are removed by washing as indicated above, the carbon black begins to disperse in the wash water and go through the filter. At this point therefore, the washing should be stopped and the black paste allowed to dry at a temperature of not over 100° C.

The finished carbon black product contains about 5% water and drying should be carried out at temperatures sufficiently low to permit retention of substantially this amount of moisture; otherwise when the product is heated to complete dryness, its dispersibility is lost or substantially reduced. The dried carbon black product containing about 5% water may then be pulverized. For redispersion of the carbon black in water a pH of 8-9 is the optimum condition for a material prepared as described in the above example. However, by the use of finer particle size blacks, such as Carbolac, or by the use of larger quantities of NaOCl to obtain more thorough oxidation, or both, blacks can be prepared which disperse spontaneously to form stable suspensions in a pH range of from 3.0 to 9.0. The desired pH may be readily obtained by adding a small amount of ammonia to the water. On adding the dry carbon black product to water, an excellent dispersion is at once obtained without stirring or grinding.

In making the paste product of our invention 30% to 60% of our novel hydrophilic carbon black in water gives a stiff paste which closely resembles in appearance and properties the special graphite paste heretofore available only at greatly increased cost.

In producing the hydrophilic carbon black of our invention very little if any change can be detected in the surface area of the finished product as compared to that of the starting carbon black. This is an unexpected characteristic since carbon black oxidized by gaseous treatment exhibits a striking increase in surface area.

The hydrophilic carbon black of our invention is of great importance when used as an ingredient for synthetic rubber; first because it can be compounded with the various synthetic rubber latices and reinforces the resulting compound, and, second, because it imparts a very desirable softness and tack to Buna S and other synthetic compounds. Buna S is otherwise deficient in tack.

Hydrophilic carbon black prepared as above explained may be added to the latex of Buna S or other synthetic rubbers in amounts giving 10 to 35% or more carbon black loading of the resulting rubber compound depending on the characteristics of the compound desired. The hydrophilic carbon black, when mixed with the latex by stirring, readily forms a satisfactory dispersion throughout the latex and the mixture thus formed may be then processed by the conventional steps usually practised in the manufacture of synthetic rubbers.

The necessity of adding organic wetting agents to the latex, which would otherwise be required, is obviated by employing hydrophilic carbon black in the manner above outlined, and appreciable saving in the cost of manufacture is made for this reason.

Sodium hypochlorite, NaOCl, used in carrying out the process of our invention, may readily be prepared by saturating a solution of NaOH with $Cl_2$, i. e., $$2NaOH + Cl_2 = NaOCl + NaCl + H_2O$$

Sodium hypochlorite has been specifically mentioned in the foregoing description but potassium hypochlorite or other hypochlorites of the sodium or alkali earth groups may be employed as equivalents or partial equivalents with appropriate modification of the illustrative process. The essential reaction of the process is vigorous and exothermic oxidation of the carbon black in the presence of moisture. One of the most economical ways of bringing this about is merely to bubble chlorine gas through an alkaline solution having carbon black present therein and so create a hypochlorite in the presence of the wetted carbon black to be treated.

Having thus disclosed our invention and described two related processes of producing the novel product thereof, we claim as new and desire to secure by Letters Patent:

1. A process for the production of paste of hydrophilic carbon black, which comprises the steps of combining granular carbon black with sodium hypochlorite in proportions of about 100 grammes carbon black to 300 cc. of water and 300 cc. of 10% NaOCl until exothermic reaction takes place, thereby forming a sludge of 8-9 pH, acidifying the sludge to bring its pH to about 2, filtering the acid sludge, washing until black begins to disperse in the wash water, and partially drying at a temperature not substantially over 100° C.

2. A process for the production of a paste of hydrophilic carbon black which comprises combining carbon black with sodium hypochlorite in proportions approximating 100 grams carbon black to 300 cc. of water and 300 cc. of 10% NaOCl until exothermic reaction takes place, thereby forming an alkaline sludge, acidifying the sludge, filtering the acid sludge, partially drying it at a temperature not substantially over 100° C. and then mixing with water in the proportion 30% to 60% hydrophilic carbon black.

FRED H. AMON.
FRED S. THORNHILL.

REFERENCES CITED

The following references are of record in the file of this patent:

UNITED STATES PATENTS

| Number | Name | Date |
|---|---|---|
| 1,481,106 | MacMahon | Jan. 15, 1924 |
| 1,748,897 | Oppe | Feb. 25, 1930 |
| 1,758,151 | Goodwin | May 13, 1930 |
| 1,807,884 | Wiegand | June 2, 1931 |
| 1,967,861 | Collin | July 24, 1934 |
| 2,131,686 | Heller | Sept. 27, 1938 |
| 2,178,383 | Wiegand | Oct. 31, 1939 |
| 2,210,763 | King | Aug. 6, 1940 |

FOREIGN PATENTS

| Number | Country | Date |
|---|---|---|
| 263,292 | Germany | Aug. 5, 1913 |